(12) United States Patent
Rouet et al.

(10) Patent No.: US 8,177,960 B2
(45) Date of Patent: May 15, 2012

(54) ASPHALTENE-STABILISING MOLECULES HAVING A TETRAPYRROLIC RING

(75) Inventors: Jean Rouet, Tours (FR); Didier Groffe, Manosque (FR); Mathieu Salaün, Carrieres sur Seine (FR)

(73) Assignee: Scomi Anticor, Peyruis (FR)

( * ) Notice: Subject to any disclaimer, the term of this patent is extended or adjusted under 35 U.S.C. 154(b) by 362 days.

(21) Appl. No.: 12/448,551

(22) PCT Filed: Dec. 24, 2007

(86) PCT No.: PCT/FR2007/052619
§ 371 (c)(1),
(2), (4) Date: Jun. 25, 2009

(87) PCT Pub. No.: WO2008/084178
PCT Pub. Date: Jul. 17, 2008

(65) Prior Publication Data
US 2010/0051508 A1 Mar. 4, 2010

(30) Foreign Application Priority Data

Dec. 27, 2006 (FR) ..................... 06 55986

(51) Int. Cl.
*C10C 3/00* (2006.01)
(52) U.S. Cl. ........................... 208/44; 208/39
(58) Field of Classification Search ............ 208/39, 208/44
See application file for complete search history.

(56) References Cited

U.S. PATENT DOCUMENTS

| 4,263,126 | A | * | 4/1981 | Rollmann | 208/14 |
|---|---|---|---|---|---|
| 5,720,871 | A | * | 2/1998 | Romine et al. | 208/39 |
| 5,826,369 | A | | 10/1998 | Jordan | |
| 6,180,683 | B1 | | 1/2001 | Miller et al. | |
| 2003/0093943 | A1 | | 5/2003 | Jordan | |

FOREIGN PATENT DOCUMENTS

| EP | 1 666 570 A2 | 6/2006 |
|---|---|---|
| FR | 2 679 151 A1 | 1/1993 |
| GB | 2 071 141 A | 9/1981 |

OTHER PUBLICATIONS

Moreira, L.F.B. et al., "Stabilization of Asphaltenes by Phenolic Compounds Extracted from Cashew-Nut Shell Liquid," Journal of Applied Polymer Science, 1999, pp. 29-34, vol. 73, John Wiley & Sons, Inc.

\* cited by examiner

*Primary Examiner* — Walter D Griffin
*Assistant Examiner* — Brian McCaig
(74) *Attorney, Agent, or Firm* — Vorys, Sater, Seymour and Pease LLP; Susanne M. Hopkins; Ari G. Zytcer

(57) ABSTRACT

Use of a biodegradable molecule or a mixture of biodegradable molecules having tetrapyrrolic rings, as stabilizers for the asphaltenes present in crude oil and crude oil derivatives.

18 Claims, No Drawings

ASPHALTENE-STABILISING MOLECULES HAVING A TETRAPYRROLIC RING

This is a National Phase Application filed under 35 USC 371 of International Application No. PCT/FR2007/052619, filed on Dec. 24, 2007, the entire content of which is hereby incorporated by reference in its entirety.

The invention relates to novel asphaltene dispersants which precipitate in crude oils or crude oil derivates such as, in particular, heavy fuel oils and asphalts. It also relates to a method for stabilising the asphaltenes present in the above-mentioned crude oil and crude oil derivates.

Asphaltenes are a family of compounds soluble in aromatic solvents and insoluble in aliphatic hydrocarbons (N-pentane, N-heptane, etc.). Their structure and composition vary from one crude oil to another, but some atoms and groups of the said structure are always present in variable proportions. Among these atoms, mention can be made of oxygen, sulphur, nitrogen, heavy metals such as nickel and vanadium. The presence of numerous polycyclic groups give the asphaltene molecules a highly aromatic character. Due to their insolubility in aliphatic hydrocarbons and according to the more or less aromatic grade of the crude oil or petroleum cuts (also called derivates), the asphaltenes may precipitate. This mechanism causes the formation of deposits in the lines, production equipment, and on the source rock, which disturbs the production of the reservoirs and may, in certain cases, cause the shutdown of the installation.

The problem of asphaltene instability has been known for many years. Several solutions have been proposed. Thus "mechanical" solutions are known, such as desasphaltening, solvent washing, mechanical scraping, and also "chemical" solutions using stabilizers in the form of polymers or surfactants.

Document FR-A-2 679 151 thus describes a mixture of alkyl aryl sulphonic acid and a cationic surfactant of the imidazoline type. Similarly, document U.S. Pat. No. 6,180, 683 discloses formaldehyde/alkyl phenol resins used in synergy with ethoxylated amines.

Even if these products have satisfactory stabilising capacities, they do not always offer the desired ecotoxic and toxicological profile. In fact, the oil industry as a whole is experiencing problems today associated with the handling of this type of product, as well as the harmful effects observed on the environment. This is especially true of the production of offshore oil fields (offshore platform, particularly in the North Sea, Gulf of Mexico, Coast of West Africa). At the same time, the products available on the market are seldom compatible with the OSPAR recommendations aimed to limit the environmental impact of the treatment products. In particular, they are not biodegradable.

The problem is therefore to propose an alternative to the synthetic chemical asphaltene stabilizers by developing products which are compatible with the OSPAR recommendations and which are in particular biodegradable.

As part of his researches, the Applicant has found that molecules comprising a tetrapyrrolic ring, such as chlorophyll for example, are particularly effective for stabilising the asphaltenes present in crude oils and petroleum cuts.

Document U.S. Pat. No. 5,826,369 describes a combustion catalyst for use as an additive in a boiler. In practice, the catalyst injected in the burner is in the form of a mixture of β-carotene, chlorophyll and jojoba oil. No reference is made to the stabilising properties of chlorophyll with regard to asphaltenes.

The invention therefore relates to the use of a biodegradable molecule or a mixture of biodegradable molecules having tetrapyrrolic rings, as stabilizers for the asphaltenes present in crude oil and crude oil derivatives.

In the rest of the description, the expression "molecules having tetrapyrrolic rings", means any molecule comprising at least one tetrapyrrolic ring in its structure, the tetrapyrrolic ring being substituted or not, the molecule being biodegradable.

Among the usable molecules, mention can be made in particular, but in a non-limiting manner, of chlorophyll, porphyrins and chlorins.

In an advantageous embodiment, the biodegradable molecule used as a stabilizer is chlorophyll.

Chlorophyll can be obtained by chemical synthesis or used in the form of a plant extract. Any chlorophyll-rich plant can be used as a source of chlorophyll. It may for example be an extract of alfalfa, Graminaceae, algae, etc. These extracts are obtained from the parts of chlorophyll rich plants. The extracts used are advantageously alcohol extracts, in particular using ethanol.

Several chlorophylls exist, differing from one another in the type of substitutes present on the nucleus, the chlorophylls being capable of complexing metals. Magnesium is usually the sequestered metal; it is easily replaced by other metals including copper. The magnesium form is unstable at temperatures above 50° C. The chlorophyll used in this case is cupric chlorophyll because of its stability. The ions can be substituted directly on the plant extract.

The invention also relates to a method for stabilising asphaltenes in crude oil or crude oil derivatives, consisting in injecting into the oil a biodegradable molecule or a mixture of biodegradable molecules having tetrapyrrolic rings.

In practice, the molecules of the invention are objected at the rate of 1 to 500 ppm and advantageously from 1 to 50 ppm of the oil.

When the molecule comprising tetrapyrrolic rings is chlorophyll in the form of a plant extract, it is previously diluted before use to a mass concentration of between 2 and 10%. Obviously, a person skilled in the art will appropriately select the useable diluent, which is selected in particular from alcohols, ketones, aromatic solvents and, ideally, a mixture of esters of vegetable oils or the vegetable oils themselves.

The invention and the advantages thereof will appear more clearly from the following embodiment.

Preparation of the Stabilizer of the Invention

An alfalfa leaf extract taken up in a hexane/acetone mixture is mixed with copper nitrate. The concentrated cupric chlorophyll extract obtained by ion exchange is diluted in a methyl ester of oleic acid to a mass concentration of 10%.

The effectiveness of the additive as asphaltene stabilizer and dispersant is evaluated by the procedure described below.

The asphaltenic components of the hydrocarbon medium, crude oil or petroleum cut are separated from the medium by selective precipitation with N-heptane.

The components thus separated are dissolved in toluene (asphaltene solubilizer) at the rate of 20 g/l. The additive is prepared with 0.05% of active matter in toluene.

In 20 ml test tubes, 200 µl of asphaltene solution is mixed with 20 to 400 µl of additives.

The tubes are shaken. An aliphatic solvent (N-heptane) is rapidly added to each tube. The tubes are closed, then overturned five times. The effectiveness of the additive is determined by observation of the precipitation and settling of the asphaltenes over time, after 24 h. A clear and dark solution free of solid precipitates characterizes a satisfactory stabilization of asphaltenes in the precipitating aliphatic solvent, while a clear and pale solution having a dark deposit is an indicator of a lack of stabilization.

The tests were performed on asphaltenes extracted from various crude oils.

The table below shows the volume of cupric chlorophyll solution used to stabilize these various asphaltenes in comparison with a common additive sold under the trade name ANTICOR DSA 801.

| Asphaltenes extracted from crude oils | 0.05% cupric chlorophyll in toluene | 0.05% of a commercial additive in toluene |
|---|---|---|
| Crude oil I (Mexico) | 280 µl | 180 µl |
| Crude oil II (Venezuela) | 280 µl | 200 µl |
| Crude oil III (France) | 240 µl | 200 µl |
| Crude oil IV (Mexico) | 360 µl | 280 µl |

As the table shows, the quantity of cupric chlorophyll required to stabilize the various asphaltenes is very low and comparable to the batches used with the product ANTICOR DSA 801.

The invention and the advantages thereof clearly appear from the above description. Noteworthy is the use of a biodegradable stabilizer which can be obtained particularly simply and has effects on asphaltenes of different origins and compositions.

The invention claimed is:

1. A process for stabilizing asphaltenes present in crude oil and crude oil derivatives, comprising adding at least one biodegradable molecule having at least one tetrapyrrolic ring in its structure to one or more of a crude oil or a crude oil derivative to produce stabilized asphaltenes.

2. The process of claim 1, wherein adding comprises injecting.

3. The process of claim 1, wherein the at least one biodegradable molecule is selected from the group consisting of a chlorophyll, a porphyrin and other compounds comprising chlorin.

4. The process of claim 3, wherein the at least one biodegradable molecule is selected from the group consisting of a chlorophyll, a chlorophyll plant extract and cupric chlorophyll.

5. The process of claim 4, wherein the at least one biodegradable molecule is chlorophyll.

6. The process of claim 4, wherein the at least one biodegradable molecule is a chlorophyll plant extract.

7. The process of claim 6, wherein the chlorophyll plant extract comprises from 2 wt % to 10 wt % chlorophyll based on the total weight of the extract.

8. The process of claim 4, wherein the at least one biodegradable molecule is cupric chlorophyll.

9. The process of claim 1, wherein adding comprises adding the at least one biodegradable molecule to one or more of a crude oil or a crude oil derivative in an amount of from 1 ppm to 500 ppm.

10. The process of claim 9, wherein adding comprises adding the at least one biodegradable molecule to one or more of a crude oil or a crude oil derivative in an amount of from 1 ppm to 50 ppm.

11. A stabilized crude oil or crude oil derivative comprising one or more of a crude oil or a crude oil derivative and at least one biodegradable molecule having at least one tetrapyrrolic ring in its structure, wherein the at least one biodegradable molecule is selected from the group consisting of a chlorophyll and other compounds comprising chlorin.

12. The stabilized crude oil or crude oil derivative of claim 11, wherein the at least one biodegradable molecule is present in an amount of from 1 ppm to 500 ppm.

13. The stabilized crude oil or crude oil derivative of claim 12, wherein the at least one biodegradable molecule is present in an amount of from 1 ppm to 50 ppm.

14. The stabilized crude oil or crude oil derivative of claim 11, wherein the at least one biodegradable molecule is selected from the group consisting of a chlorophyll, a chlorophyll plant extract, and cupric chlorophyll.

15. The stabilized crude oil or crude oil derivative of claim 14, wherein the at least one biodegradable molecule is chlorophyll.

16. The stabilized crude oil or crude oil derivative of claim 14, wherein the at least one biodegradable molecule is chlorophyll plant extract.

17. The stabilized crude oil or crude oil derivative of claim 16, wherein the chlorophyll plant extract comprises from 2 wt % to 10 wt % chlorophyll based on the total weight of the extract.

18. The stabilized crude oil or crude oil derivative of claim 14, wherein the at least one biodegradable molecule is cupric chlorophyll.

\* \* \* \* \*